(12) United States Patent
Tsangaris et al.

(10) Patent No.: US 6,817,388 B2
(45) Date of Patent: Nov. 16, 2004

(54) MULTIPLE PLASMA GENERATOR HAZARDOUS WASTE PROCESSING SYSTEM

(75) Inventors: Andreas V. Tsangaris, Ottawa (CA); George W. Carter, Ottawa (CA); Jesse Z. Shen, Ottawa (CA); D. Michael Feasby, Ottawa (CA); Kenneth C. Campbell, Kitchener (CA)

(73) Assignee: RCL Plasma, Inc., Gloucester (CA)

( * ) Notice: Subject to any disclaimer, the term of this patent is extended or adjusted under 35 U.S.C. 154(b) by 0 days.

(21) Appl. No.: 10/776,304

(22) Filed: Feb. 11, 2004

(65) Prior Publication Data

US 2004/0159366 A1 Aug. 19, 2004

(30) Foreign Application Priority Data

Feb. 12, 2003 (CA) .............................................. 2418836

(51) Int. Cl.[7] ............................................... B65B 1/04
(52) U.S. Cl. ....................... 141/82; 141/67; 219/121.37; 219/121.38; 588/210; 110/252; 110/242

(58) Field of Search ............................... 141/82, 67, 65, 141/66, 98; 219/121.36–121.38, 121.59; 588/210, 211; 110/242, 250–256

(56) References Cited

U.S. PATENT DOCUMENTS

| | | | | | |
|---|---|---|---|---|---|
| 3,941,065 | A | * | 3/1976 | Albrecht | 110/243 |
| 5,136,137 | A | * | 8/1992 | Schlienger | 219/121.59 |
| 5,541,386 | A | * | 7/1996 | Alvi et al. | 219/121.38 |
| 5,958,264 | A | * | 9/1999 | Tsantrizos et al. | 219/121.38 |
| 6,155,182 | A | * | 12/2000 | Tsangaris et al. | 110/255 |

* cited by examiner

*Primary Examiner*—Steven O. Douglas
(74) *Attorney, Agent, or Firm*—Thomas R. Vigil; Welsh & Katz, Ltd.

(57) ABSTRACT

A waste processing system is provided herein which entails the use of at least one fixed-position plasma arc generator for primary processing and at least one moveable plasma arc generator for secondary processing assistance and/or final conditioning of the slag prior to exit from the reactor vessel. This optimum processing environment is provided by control of reactor vessel configuration and real time control of processing characteristics to ensure maximum processing efficiency.

29 Claims, 8 Drawing Sheets

MULTIPLE PLASMA GENERATOR HAZARDOUS WASTE PROCESSING SYSTEM

BACKGROUND OF THE INVENTION

1. Field of the Invention

This invention relates to a method and a system for the disposal of waste and/or hazardous materials waste.

2. Description of the Prior Art

A major problem facing modern society is the disposal of toxic waste and/or hazardous materials in a manner which minimizes harmful effects on the environment. Such a disposal system is one which is capable of reducing such toxic and/or hazardous waste to compounds which are suitable for environmental disposal. Such suitability is, of course, defined in terms of acceptable levels of pollution, and is determined by a variety of regulatory agencies.

Traditionally, hazardous waste disposal has taken the form of direct burial in landfills, or simple thermal processing of the waste, followed by burial of the solid residue, and release to the atmosphere of the volatile residue. None of these approaches have proven acceptable, due to the fact that the materials which are released to the environment tend to remain as unacceptable sources of pollution.

Another normal approach for a system for the disposal of waste and/or hazardous materials is to apply a single heat source into a confined space in an apparatus on the assumption that the temperature within the reactor vessel of the processing system will be uniform. This assumption is without knowledge of potential cold spots which can develop within the reactor vessel of the processing system. Such systems normally gasify all of the input waste constituents; however, they do not guarantee that all such gaseous elements are subjected to the total temperature environment which is necessary to ensure total and effective destruction of the more hazardous of the waste and/or hazardous materials. A single heat source which is provided at the center of the reactor vessel processing system can create paths close to the refractory wall of the reactor vessel of the processing system whereby gaseous elements can traverse without being subjected to the required temperature/residence time combination for complete breakdown. Also, the generation of gaseous elements within the reactor vessel from the gasification process can very dramatically alter the gas flow pattern within the reactor vessel. This can result in gaseous hazardous compounds being exhausted from the reactor vessel and/or not fully processed waste constituents being transferred to slag. Downstream combustion does not achieve the full temperature capability of certain processing systems, i.e., plasma processing systems. Therefore, hazardous gaseous compounds being exhausted from the reactor vessel of the processing system result in abnormal complexity through gas handling and potentially excessive pollutants being exhausted to the atmosphere. Not fully processed waste in slag can result in some or all of this hazardous material remaining in the slag after the slag is extracted from the reactor vessel. This may mean that the slag exceeds leachate toxicity limits and, thereby, remains as a hazardous waste requiring continued special disposal or storage requirements.

Other processing systems for the disposal waste and/or hazardous materials attempt to overcome these shortcomings by dramatically increasing the overall reactor vessel temperature using plasma arc generators, thus ensuring that the minimum temperature encountered throughout the reactor vessel processing chamber is sufficient for adequate thermal decomposition of all waste constituents. This approach solves the problem of insufficient exposure of some waste constituents to the high temperature which is necessary to achieve good thermal decomposition. However, in so doing, it also creates other problems, including increased plasma generator electrode erosion, decreased reactor vessel refractory life, increased heat losses, increased electricity consumption, increased cooling load for the gas handling system and increased volatilization of pollutant elements, particularly heavy metals. The resultant higher temperature product gas on exit is not only wasteful of plasma arc generator power, but is also very conducive to increased hazardous pollutants. Such problems aggregate dramatically to reduce overall system processing efficiency and cost effectiveness.

A number of approaches have thus been developed for disposing of industrial waste products. The patent literature is replete with alleged such solutions.

U.S. Pat. No. 3,766,866, issued Oct. 23, 1973 to Krum, taught a thermal waste converter with primary and secondary chambers for the pyrolysis and combustion of waste material. Thus, this patent provided apparatus for the recycling of waste material having a pyrolyzing chamber for the gasification of waste material including an inlet for the waste and an outlet for the gas produced therefrom. An independent secondary chamber had an inlet for gas from the pyrolyzing chamber and an outlet for gases of combustion. Means connected the outlet of the pyrolyzing chamber to the inlet of the secondary chamber. Means directed solid residues from the pyrolyzing chamber to the secondary chamber. A burner in the secondary chamber burned combustible gas which is produced in the pyrolyzing chamber to reduce the solid residue in the secondary chamber to a molten condition.

U.S. Pat. No. 4,438,706, issued Mar. 27, 1984 to Boday, provided an attempt to destroy waste material using direct current (DC) arc discharge type plasma torches. This patent taught the use of DC arc discharge plasma torch in combination with an oxidizing agent for the thermochemical decomposition of certain types of waste material. The torch gas was air, and the waste material in vapor form was introduced along with oxygen downstream of the plasma arc generator, where it was heated by the torch gas. The method included transferring plasma into a plasma torch at one end of a plasma reactor. The method included introducing organic waste vapor and preheated oxygen into the torch for interaction with the plasma. The method finally included discharging end products of the interaction from the end of the plasma reactor, opposite to the location of the torch, into gas washing equipment.

Faldt, et al, U.S. Pat. No. 4,479,443, issued Oct. 30, 1984, disclosed the use of an arc discharge plasma torch thermally to decompose waste material. Waste material in the form of solid particles were introduced downstream of the arc to avoid fouling of the torch as a result of particle adherence. Oxidizing agents, e.g., oxygen and air, were mixed with the waste either before, during or after the waste was heated by the torch gas. Sufficient oxidizing agents were required for the complete oxidation of the waste material. The apparatus included a plasma generator for producing a high temperature plasma in which all molecules of the plasma reach at least a desired minimum temperature. The apparatus included means for feeding hazardous waste to and through the plasma generator. The apparatus included means for feeding sufficient oxidizing agents to the hazardous waste to permit the complete decomposition of the hazardous waste to stable products. The apparatus included means for controlling the temperature of the plasma and the flow of hazardous waste through the plasma generator so that the hazardous waste can reach a sufficiently high temperature for a sufficient period of time thermally to decompose completely to stable final products.

Barton, et al, U.S. Pat. No. 6,644,877, issued Oct. 30, 1984, disclosed the use of a DC arc plasma burner for the pyrolytic decomposition of waste. Provisions were made for feeding waste material downstream of the arc electrodes to prevent interference with the formation or generation of the plasma arc. A reaction chamber following the burner was used to combine gas and particulate matter, which is quenched and neutralized with an alkaline spray. A mechanical scrubber was used to separate gases, which are withdrawn using an exhaust fan. The apparatus included a plasma burner having a temperature in excess of 5,000° C. The apparatus included a reaction vessel connected to the plasma burner and having a refractory lined reaction chamber for receiving the plasma arc. The apparatus included means for inserting waste material directly into the plasma arc in the co-linear electrode space to be atomized and ionized under substantially pyrolytic conditions and then recombined into recombined products in the reaction chamber. The apparatus included an outlet for removing the recombined products therefrom.

Chang, et al U.S. Pat. No. 4,886,001, issued Dec. 12, 1989, provided apparatus for pyrolytically decomposing waste material. The apparatus included a plasma torch to produce a plasma having an operating temperature of at least 5000° C. for destroying a solution of a waste material to form a mixture of gases and solid particulate. The torch was combined with means for introducing the waste material in an atomized state. The apparatus included a recombination chamber for receiving and separating the mixture of gases and solid particulate. The apparatus included a solid separator for providing a partial vacuum for removing any carryover gases from the solid particulate.

U.S. Pat. No. 5,256,854, issued Feb. 22, 1994 to Bromberg et al, taught a method and apparatus for simultaneously bombarding toxic gases with high energy electron irradiation and rf inductive fields to destroy vaporized toxic materials. Thus, this patent provided a two-chamber system for destroying toxic waste comprising a first chamber adapted to heat and vaporize the toxic waste and a second chamber adapted to receive gases from the first chamber. The second chamber was used to break down toxic molecules in the gases via a tunable combination of simultaneous and continuous inductive heating and electron beam irradiation at no less than atmospheric pressure and at temperatures lower than those required to destroy toxic waste by inductive heating alone.

U.S. Pat. No. 5,288,969, issued Feb. 22, 1994 to Wong et al, taught an inductively coupled rf plasma torch technology operating at atmospheric pressures for the dislocation of hazardous waste. Thus, this patent provided apparatus which included a source of waste material to be processed. The apparatus included a source of gas capable of forming free electrons in a plasma when excited to a high temperature. The apparatus included combining means for combining the waste material with the gas. The apparatus included a reactor chamber. The apparatus included means for transporting the combination of the waste material and the gas through the reactor chamber. The apparatus included excitation means for exciting the gas in the reactor chamber with electromagnetic energy to form a plasma including free electrons, wherein the excitation means comprised an RF plasma torch. The apparatus included timing means for maintaining the free electrons at the raised temperature level in the reactor chamber for a sufficient time to dissociate the waste material.

U.S. Pat. No. 5,541,386, issued Jul. 30, 1996, to Mui et al, provided a system and method for the disposal of waste material including water, volatile components and vitrifiable components. The waste material was heated in a dehydrator to remove the water, was then heated in a high temperature dryer to vaporize hydrocarbon liquids, and then was fed to the focus point of a primary plasma reactor where plasma arc jets were focused on the surface of a pool of the vitrifiable components. At the focus point, the vitrifiable components were melted, and the volatile components are volatized. The melted components were received in a quench chamber where they solidified on a quench roller and were broken into chips and delivered to a receiving area. Heat from the quench chamber was transferred to the dehydrator and high temperature dryer. The hydrocarbon liquids and volatized components were fed to a secondary plasma reactor where they were disassociated into their elemental components. The effluent from the secondary plasma reactor was scrubbed to remove hydrogen sulfide and halogens, and residual components, together with excess water vapor, were extracted in an absorber and fed back for further processing in the secondary plasma reactor.

U.S. Pat. No. 5,779,991, issued Jul. 14, 1998 to Jenkins, taught an apparatus for destroying hazardous compounds in a gas stream using a cylindrical labyrinth passage wherein a plurality of electric fields were used for generating and sustaining a plasma or corona discharge through different zones within the gas labyrinth. Thus, this patent provided a mobile waste incinerator which included separate first and second zones, the first zone having a first live electrode and a ground electrode, the electrode including a first compartment and a second compartment. The mobile waste incinerator included means for exciting the first live electrode at a first electrical energy level for generating, with the first compartment, a first electric field and for generating a plasma in the waste gas when the waste gas was flowing through the first gas passage. The mobile waste incinerator included a second zone having a second live electrode mounted inside and spaced apart from the second compartment and defining, with said second compartment, a second gas passage communicating with the downstream end of the first gas passages. The mobile waste incinerator included means for exciting the second live electrode at a second electrical energy level for generating, with the second compartment, a second electric field capable of sustaining the plasma in the waste gas when the waste gas was flowing through said second gas passage. The mobile waste incinerator included means for generating a third electric field between the second live electrode and the first live electrode for providing a complementary source of electrical energy between the first and second electric fields for sustaining the plasma between the first and the second zones.

U.S. Pat. No. 5,798,496, issued Apr. 22, 2003, to Eckhoff et al, taught a mobile plasma-based waste disposal system which utilized an arc-torch plasma technology to dispose of industrial waste. The portable reactor included a rotatable kiln comprising an upper end for introduction of waste material and a lower end, said rotatable kiln mounted on a movable vehicle. It included a breech disposed adjacent the lower end of the kiln, at least one of the breech and lower end forming an outlet for discharge of pyrolytically treated waste material. It includes at least two plasma guns attached to the breech and disposed so as to direct an arc into the kiln.

It included at least two target electrodes spaced from the plasma guns and attached to at least one of the breech an the kiln. At least one of the plasma guns and at least one of the target electrodes was movable.

U.S. Pat. No. 6,552,295, issued Apr. 22, 2003, to Markunas et al provided a method and apparatus for plasma waste disposal of hazardous waste material, where the hazardous material was volatilized under vacuum inside a containment chamber to produce a pre-processed gas as input to a plasma furnace including a plasma-forming region in which a plasma-forming magnetic field was produced. The pre-processed gas was passed at low pressure and without circumvention through the plasma-forming region and was directly energized to an inductively-coupled plasma state such that hazardous waste reactants included in the pre-processed gas were completely dissociated in transit through the plasma-forming region. Preferably, the plasma-forming region was shaped as a vacuum annulus and was dimensioned such that there was no bypass by which hazardous waste reactants in the pre-processed gas can circumvent the plasma-forming region. The plasma furnace was powered by a high frequency power supply outputting power at a fundamental frequency. The power supply contained parasitic power dissipation mechanisms to prevent non-fundamental, parasitic frequencies from destabilizing the fundamental frequency output power.

SUMMARY OF THE INVENTION

The prior art plasma waste decomposition systems described above suffered from a variety of shortcomings. One shortcoming results from the fact that the waste material generally cannot be introduced directly into the plasma arc because such introduction causes contamination of the arc electrodes and subsequent erratic operation of the arc. Thus, the waste material was introduced downstream of the arc and was indirectly heated by the torch gas. This technique shortened the high temperature residence time of the waste material, resulting in incomplete decomposition.

Further, the performance of the plasma arc is highly sensitive to the flow rate of the waste and carrier gas. Thus, the flow rates must be confined within narrow limits, leading to difficulties in controlling and maintaining system performance. Arc electrode erosion with use further complicated the maintenance, operation, stability and safety of the system. Small scale operation of DC arc plasmas was also very inefficient due in part to the minimum gas flow rate and electric power requirements needed to strike initiate and sustain the arc. Scaling the prior art systems for operation at different waste throughput levels and with a variety of waste materials has proven to be difficult, requiring major system configuration changes which are expensive to accomplish.

Additionally, the need for organic, oxidizing, and/or reducing agents to be confined with the waste material in the prior art systems often resulted in highly undesirable compounds in the waste residue.

In summary, none of the prior art systems have provided a consistent method of reducing all types and forms of hazardous waste to compounds which were suitable for environmental disposal.

It is therefore an object of a broad aspect of the present invention to address these shortcomings and to provide hazardous waste processing systems and methods which ensure total destruction of all hazardous constituents while maintaining a low input power level and a long refractory life.

STATEMENTS OF THE INVENTION

One broad embodiment of the present invention provides an apparatus for the disposal of waste and/or hazardous materials. The apparatus includes a refractory-lined reactor vessel. The apparatus includes plasma-generating means within the refractory-lined reactor vessel for producing a high temperature plasma processing zone which has a substantially-uniform high temperature across the entire periphery of the refractory-lined reactor vessel. The plasma-generating means includes at least one fixed-position plasma arc generator, and at least one movable plasma arc generator. The apparatus includes first feeding means for feeding the waste and/or hazardous materials to, and through, the high temperature plasma processing zone. The apparatus includes second feeding means for feeding sufficient process additive agents to the high temperature plasma processing zone to cause the complete decomposition of the waste and/or hazardous materials and the formation of stable, non-hazardous materials. The apparatus includes controlling means for controlling the plasma arc generating means and the flow of the waste and/or hazardous materials through the high temperature plasma processing zone to assure that all the waste and/or hazardous material reaches a sufficiently high temperature, and for a sufficient period of time, thermally to fully decompose the waste and/or hazardous materials into very small ions. Adequate process additives are made available to establish the optimum chemical equilibrium that will convert the decomposition products into stable non-hazardous final products. The apparatus includes gas removal means for removing product gas from the reactor vessel. The apparatus includes monitoring means for monitoring the gas stream to determine the amount of particulate matter in the product gas stream. The apparatus includes solids removing means for removing solid stable non-hazardous final product in a lava like state from the apparatus.

A second broad embodiment of the present invention provides a method for the disposal of waste and/or hazardous materials. The method includes providing a refractory-lined cylindrical reactor vessel with plasma-generating means within the refractory-lined reactor vessel and producing a high temperature plasma processing zone therein which has a substantially-uniform high temperature across the entire periphery of the refractory-lined reactor vessel, by way of plasma-generating means which includes at least one fixed-position plasma arc generator, and at least one movable plasma arc generator. The method includes feeding, preferably continuously, solid and/or liquid waste and/or hazardous materials to, and through, the high temperature plasma processing zone. The method includes selectively, preferably continuously, feeding sufficient process additive agents to the high temperature plasma processing zone, for completely decomposing the waste and/or hazardous materials and to form stable, non-hazardous materials. The method includes removing, preferably continuously, gaseous products from the refractory lined reactor vessel. The method includes monitoring, preferably continuously, the gaseous products to determine the amount of particulate material in the gaseous products. The method includes removing solid stable non-hazardous final product from the refractory-lined reactor vessel.

OTHER FEATURES OF THE INVENTION

By a first feature of the apparatus embodiment of the present invention the at least one fixed position plasma arc generator is a plurality of, e.g., two, fixed position plasma arc generators, which are disposed within the refractory-lined reactor vessel from opposite sides thereof, with angular displacement relative to each other in order for their plasma plumes to intersect at a focal point which is near the center of the waste and/or hazardous material input into the apparatus.

By a second feature of the apparatus embodiment of the present invention, the at least one movable plasma arc generator is a single moveable plasma arc generator which is mounted at the top of the refractory-lined reactor vessel and which has three degrees of freedom to permit aiming towards the focal point of the plasma arc plumes from the fixed position plasma arc generators or towards the molten slag pool.

By a third feature of the apparatus embodiment of the present invention, the first feeding means comprises a plurality of waste and/or hazardous material feed ports, each of which is configured to feed directly towards the focal point of the plasma arc plumes from the fixed position plasma arc generators.

By a fourth feature of the apparatus embodiment of the present invention, the gas removal means and the solids removal means are ports which are diametrically opposite to the first feeding means.

By a fifth feature of the apparatus embodiment of the present invention, the apparatus includes at least one port for the injection of steam towards a point which is just past the intersection focal point of the plasma arc plumes from the fixed position plasma arc generators, on the opposite side from the feed inlet. It also includes a steam injection port covering the gas exit area.

By a sixth feature of the apparatus embodiment of the present invention, the feeding means comprises a plurality of air inlet ports disposed in spaced-apart relation around the refractory-lined reactor vessel.

By a seventh feature of the apparatus embodiment of the present invention, the gas removal means comprises a gas outlet conduit which is configured to produce an exit velocity of the gas conducive for airborne solids to fall back into the reactor vessel rather than be carried out of the reactor vessel by the exiting gas stream.

By an eighth feature of the apparatus embodiment of the present invention, a lower section of the refractory-lined reactor vessel is flanged to enable connection of a removable bottom element to the remainder of the refractory-lined reactor vessel to facilitate opening.

By a ninth feature of the apparatus embodiment of the present invention, the refractory lining comprises materials similar to AP. Green G26LI, G23LI, G20LI and Insulblok 19.

By a tenth feature of the apparatus embodiment of the present invention, a lower section of the refractory-lined reactor vessel consists of a hot face refractory, the hot face refractory comprising materials similar to RADEX COMPAC-FLO V253 or DIDIER RK30.

By an eleventh feature of the apparatus embodiment of the present invention, the apparatus includes optional water cooling means for the lower section of the refractory-lined reactor vessel.

By a twelfth feature of the apparatus embodiment of the present invention, the monitoring means includes sensors which are configured to determine the opacity of the exit gas stream.

By a thirteenth feature of the apparatus embodiment of the present invention, the sensors are maintained essentially-deposit free by a nitrogen purge element which is configured to provide a flow of nitrogen across the face of the sensors.

By a fourteenth feature of the apparatus embodiment of the present invention, the sensors are maintained essentially-deposit free by an element which is configured to maintain a negative pressure in the region of the sensors.

By a fifteenth feature of the apparatus embodiment of the present invention, the apparatus also includes a removable preheat burner within the refractory-lined reactor vessel.

By a sixteenth feature of the apparatus embodiment of the present invention, the refractory-lined reactor vessel is cylindrical.

By a first feature of the method embodiment of the present invention, the method includes disposing the at least one movable plasma arc generator in close proximity to the ports which feed the waste and/or hazardous materials to, and through, the high temperature plasma processing zone.

By a second feature of the method embodiment of the present invention, the method further includes injecting steam towards the high temperature plasma zone and towards the gas exit area.

By a third feature of the method embodiment of the present invention, the method comprises disposing air inlet ports in spaced-apart relation around the refractory-lined cylindrical vessel and selectively feeding the process additive agents into the high temperature plasma processing zone through the inlet ports.

By a fourth feature of the method embodiment of the present invention, the method further comprises creating an exit velocity of the gaseous products which is conductive for airborne solids to fall back into the reactor vessel as opposed to being carried out of the reactor vessel by the exiting gas stream.

By a fifth feature of the method embodiment of the present invention, the method includes the option of cooling a lower section of the refractory-lined cylindrical vessel.

By a sixth feature of the method embodiment of the present invention, the method includes monitoring of the gaseous products by determining the opacity of the gaseous products by opacity sensors.

By a seventh feature of the method embodiment of the present invention, the method further comprises maintaining the opacity sensor elements essentially deposit free by flowing a stream of nitrogen across the face of the sensor elements.

By an eighth feature of the method embodiment of the present invention, the method further comprises maintaining the opacity sensors essentially deposit free by maintaining a negative pressure in the region of the sensors.

By a ninth feature of the method embodiment of the present invention, the method further comprises the first step of preheating the refractory-lined cylindrical vessel by means of a removable burner system.

GENERALIZED DESCRIPTION OF THE INVENTION

The present invention preferably entails the use of multiple, e.g., two, fixed position plasma arc generators for primary processing and a single movable plasma arc generator for secondary or processing assistance and/or for final conditioning of the slag prior to exit from the apparatus, i.e., reactor vessel. As will be described hereinafter, the present invention provides control of reactor vessel geometry to ensure maximum processing efficiency. Positioning and operation of the plasma arc generators provides for a high temperature processing zone where it is optimally required, as well as to provide adequate heat concentration to melt and force the slag to flow, in addition to achieving the lowest possible product gas temperature at the product gas exit port.

Most complete breakdown of waste and/or hazardous materials is achieved if a high temperature processing zone is maintained as a solid wall across the entire periphery of the reactor vessel to ensure that all input waste and/or hazardous materials are forced to go through it. In aspects of the present invention, the fixed position plasma arc generators for primary processing are provided in the reactor vessel at opposite sides of the reactor vessel with angular displacement relative to each other and aimed to permit their plasma plumes to intersect at a focal point and provide fullest temperature coverage of the hazardous waste feeder opening into the reactor vessel. The focal point of the plasma arc plumes from these plasma arc generators is preferably fixed near the center of the input waste. They can also be adjusted so as to ensure the maintenance of the optimal high temperature processing zone as well as to induce advantageous gas flow patterns around the entire reactor vessel. The moveable plasma arc generator is preferably mounted in the top of the reactor vessel and possesses three degrees of freedom to permit aiming of its plasma arc plume at, or around, the intersection of the plasma arc plumes from the fixed position plasma arc generators to provide secondary, or assisted processing should the need arise. It may also permit aiming of its plume towards the slag pool at, or around, the slag exit port for slag conditioning. Secondary processing assistance from the moveable plasma arc generator is advantageous through periods of lowering processing temperature due to unexpected changes in the chemical composition characteristics of the input waste and/or hazardous material. Slag conditioning is essential to ensure that the slag exit port remains open through the complete slag extraction period and to maintain the slag as homogeneous as possible to guard against the possibility that some incompletely-processed material may inadvertently make its way out of the reactor vessel during slag extraction. All plasma arc generators may be operated on a continuous basis at the discretion of the operator.

The reactor vessel physical design characteristics are determined by a number of factors, namely:

Firstly, the chemical composition of the waste and/or hazardous material stream to be processed. The internal configuration and size of the reactor vessel are dictated by the operational characteristics through analyses of the input waste stream to be processed.

Secondly, the plasma arc generators. The plasma arc generators must be positioned within the reactor vessel at the desired depth in order to concentrate the high temperature processing zone where it will be most effective, while at the same time minimizing plasma arc generator heat loses.

Thirdly, the position and orientation of the plasma arc generators. The plasma arc generators must be positioned, and their plasma heat must be directed, in such a way as to ensure an adequate travel path for all gaseous molecules produced. This is to maintain a sufficient residence time in the high temperature processing zone to guarantee their full decomposition, and conversion into the smallest and most non-polluting molecules.

Fourthly, the position, orientation and number of the process additive injection ports. The process additives must be injected where they will ensure most efficient reaction to achieve the desired conversion result.

The waste feed location, the plasma arc generators insertion depth, their position and orientation, and the position, orientation and number of the process additive ports are all important in establishing the desired flow and temperature distribution features that are critical in minimizing refractory erosion with the best possible compromise of a temperature profile, i.e. very high temperature processing zone, high temperature slag melting/tapping zone and medium temperature gas exit. This generalized description of the present invention may be represented by an embodiment which includes the following features with the overall objective of:

1. full decomposition of the waste in order to achieve minimization of pollutants;
2. full melting and homogenization of the slag, and
3. minimization of exhaust heat loses.

The embodiment includes two opposing side mounted plasma arc generators with center line angular displacement and a combined plasma arc plume fixed focal point close to the center of the input waste and/or hazardous material stream. The angular displacement provides for turbulence within the input waste and the generated product gas substantially to assist in the efficiency of processing. The fixed focal point generates a total wall of high temperature processing zone through which all elements of the input waste are forced to pass.

The embodiment includes a top mounted plasma arc generator with three degrees of freedom to permit the plasma arc plume from this generator to be directed to supply plasma heat in support of the side mounted processing plasma arc generators, or to be directed to be concentrated on the slag pool at and around the slag exit port. This plasma arc generator is mounted at the rear of the reactor vessel, diametrically opposite to the incoming waste front and in close proximity to the by-product exit ports to ensure the maintenance of the fill required processing temperature for both of the process by-products.

The embodiment includes a plurality of input waste feed ports to cater to any physical characteristics of the input waste and/or hazardous waste materials, each of which feed directly into the high temperature processing zone focal area as created by the plasma arc plumes from the side mounted plasma arc generators.

The embodiment includes slag exit port and product gas outlet conduit diametrically opposite to the feed ports to ensure the maximum path possible for both the solid and gaseous process by-products for maximum processing efficiency for hazardous constituent destruction. This gas outlet conduit is vertically positioned and is configured for a gas exit velocity conducive for airborne solids to fall back into the reactor vessel as opposed to being carried out of the reactor vessel with the exiting gas.

The embodiment includes a plurality, e.g., up to three, process additive input ports for steam injection, these ports being strategically located to direct steam into the high temperature processing zone and into the product gas mass just prior to its exit from the reactor vessel.

The embodiment includes a plurality, e.g., up to five, process additive input ports for air injection, these ports being strategically located in and around the reactor vessel to ensure fill coverage of process additives into the processing zone.

The embodiment includes a flanged lower section of the reactor vessel which is connected to a flanged main section of the reactor vessel to facilitate opening of the reactor vessel for refractory inspection and repair as the need might arise.

The embodiment includes a layer of up to seventeen inches, or more, of specially selected refractory lining throughout the entire reactor vessel to ensure maximum retention of processing heat while being impervious to chemical reaction from the input waste stream and processing intermediate chemical constituents.

The embodiment includes a plurality, e.g., up to four, CCTV ports to maintain operator full visibility of all aspects of processing.

The type and quantity of the process additives are very carefully selected to optimize input waste hazardous constituent destruction while maintaining adherence to regulatory authority emission limits and minimizing operating costs. Steam input ensures sufficient free oxygen and hydrogen to maximize the conversion of decomposed elements of the input waste into fuel gas and/or non-hazardous compounds. Air input assists in processing chemistry balancing to maximize carbon conversion to a fuel gas (minimize free carbon) and to maintain the optimum processing temperatures while minimizing the relatively high cost plasma arc input heat. The quantity of both additives is established and very rigidly controlled as identified by the outputs for the waste being processed. The amount of air injection is very carefully established to ensure a maximum trade-off for relatively high cost plasma arc input heat while ensuring the overall process does not approach any of the undesirable process characteristics associated with incineration, and while meeting and bettering the emission standards of the local area.

It has been found through many years of plasma gasification processing that the amount of particulate matter in the product gas stream has a direct relationship to the emission rate of polluting elements. Pollutants tend to adhere to particulate matter, which assists their exit from the reactor vessel and through the exhaust piping. It has been found that minimizing the amount of particulate matter in the gas stream also minimizes the emission rate for most pollutants. One manner of determining changes in the amount of particulate matter in the gas stream is to monitor the gas stream opacity and establish a baseline for an acceptable concentration in accordance with regulatory authority restrictions within the location of processing. Thereafter, real-time feedback of opacity within the product gas piping provides a mechanism for automation of process additive input rates, primarily steam, to maintain the level of particulate matter below the maximum allowable concentration.

In order to optimize the operation of the opacity monitors, it is desirable to maintain sensor elements which are free of deposits therein to ensure accuracy of readings. The prevention of deposition on the sensor elements is achieved by either of two methods: firstly, the provision of a small amount of nitrogen across the face of each element to prevent airborne particles from settling; secondly, the maintenance of a slightly negative pressure in this portion of the gas handling system to ensure airborne particles are drawn past the sensor elements. Typically, nitrogen is used unless it will be detrimental to the chemical composition of the gas stream depending on the waste stream being processed and the potential use to be made of the gas on exit.

The flanged lower section which is connected to the flanged main upper section of the reactor provides for the ease of inspection and repair of the refractory lining as the need might arise. The refractory lining in the bottom section of the reactor vessel is much more prone to wear and deterioration since it must withstand higher temperatures from the operating plasma arc generators and it is continuously in contact with the hot molten slag. The refractory in the lower section is, therefore designed to consist of a more durable "hot face" refractory than the refractory on the reactor vessel walls and top. For example, the refractory on the walls and top can be made of DIDIER RK30 brick, and the different "hot face" refractory for the lower section can be made with RADEX COMPAC-FLO V253.

In other embodiments, the lower section may also be water cooled, preferably through the outer shell, to prevent abnormal deterioration of the refractory lining. A duplicate lower section may also be constructed to facilitate faster return of the processing facility to operational status through periods of refractory repair or to provide for alternate construction to accommodate processing of more demanding and/or corrosive input waste streams.

Process control may be automated through up to three operational characteristics, namely: reactor vessel pressure changes attributable to a non-optimal feed rate, input waste stream chemical characteristic changes or constrictions in the product gas handling system due to the build up of solid deposits; reactor vessel and product gas temperature changes attributable to a non-optimal feed rate or input waste stream chemical characteristic changes; and product gas opacity reading increases attributable to non-optimal processing and/or input waste stream chemical characteristic changes.

Other embodiments of the present invention may include varying numbers of plasma arc generators, steam injection ports, air injection ports and CCTV ports depending on the waste stream under consideration and the desired operational characteristics.

BRIEF DESCRIPTION OF THE DRAWINGS

Embodiments of the present invention will now be described, by way of example only, with reference to the attached Figures, wherein.

DESCRIPTION OF PREFERRED EMBODIMENTS

Figure 1:
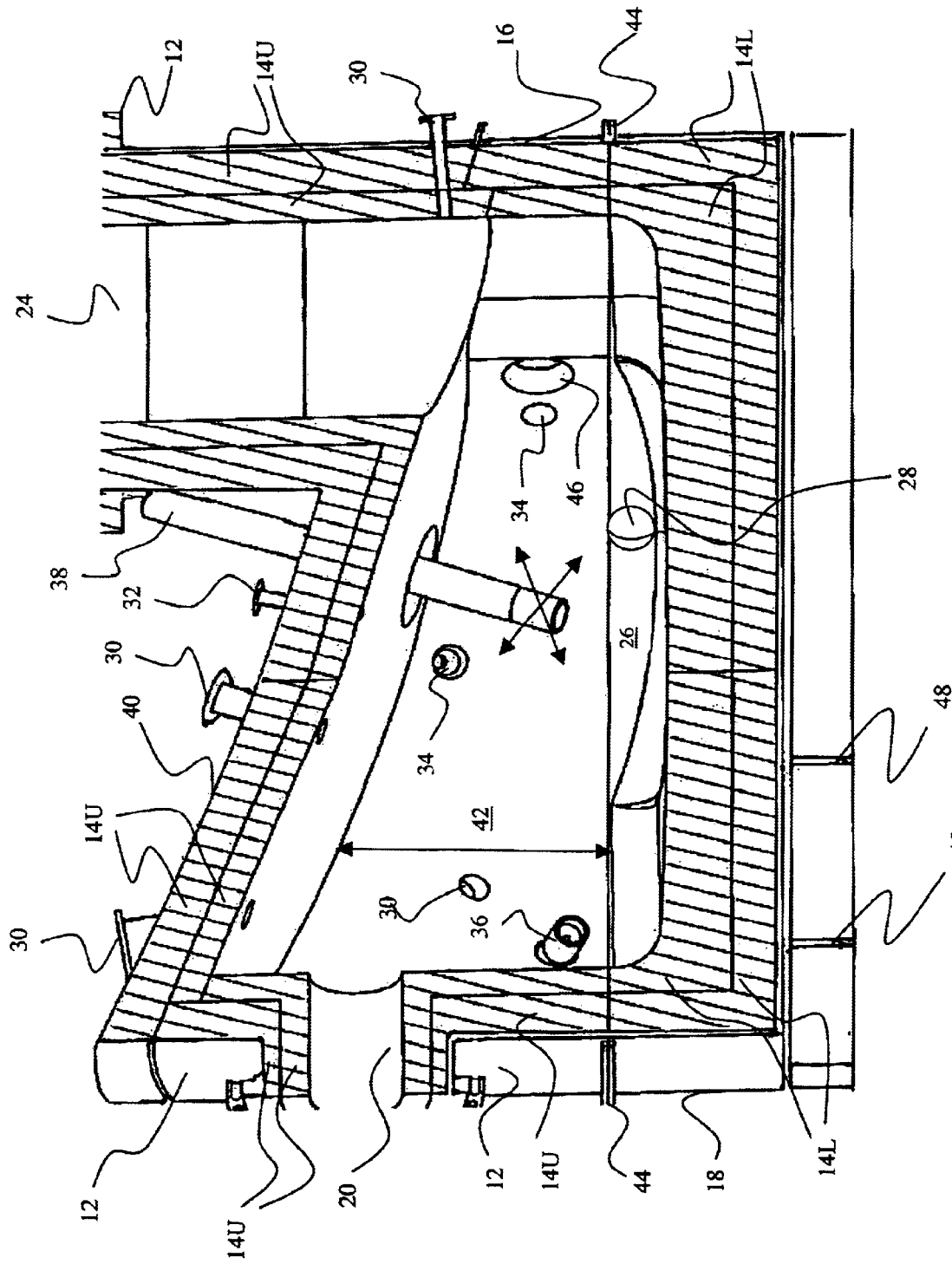
FIG. 1 is a central longitudinal cross-section of the refractory-lined reactor vessel of one embodiment of an aspect of the present invention.
Figure 2:
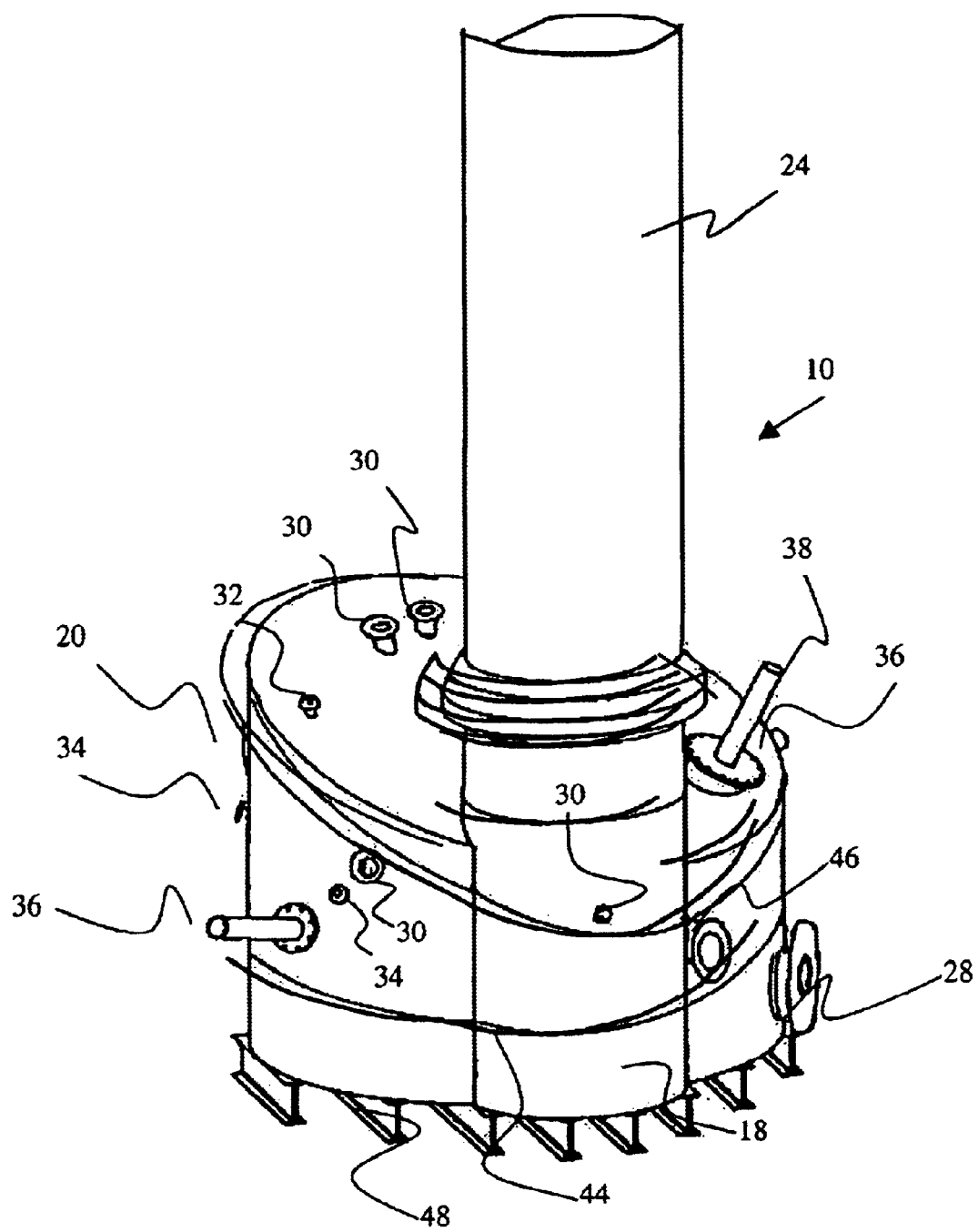
FIG. 2 is a side and rear isometric view of the refractory-lined reactor vessel of FIG. 1, particularly showing the inlet and outlet ports.
Figure 3:
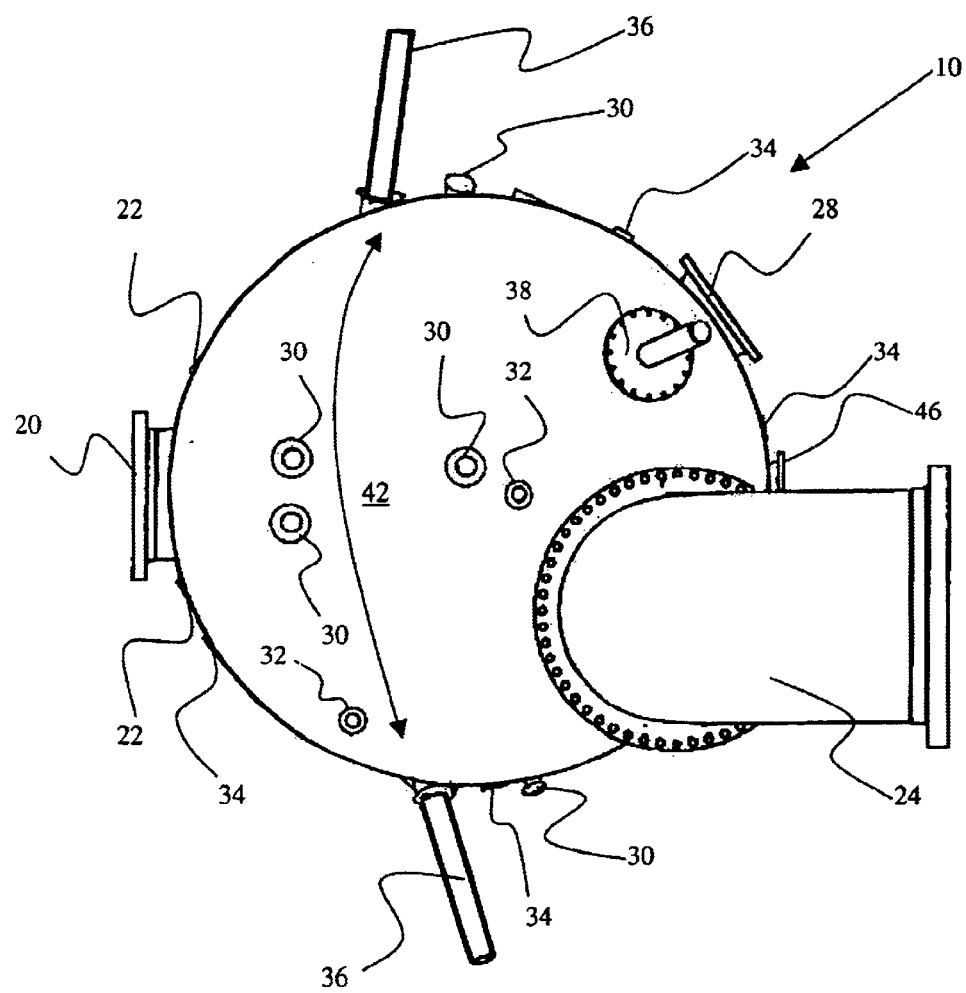
FIG. 3 is a top plan view of the refractory-lined reactor vessel of FIG. 1.

One embodiment of an aspect of the present invention includes three plasma arc generators mounted in a cylindrical, refractory-lined reactor vessel with sloping top, as depicted in FIG. 1, FIG. 2 and FIG. 3, and as will be described in detail hereinafter. As seen therein, the cylindrical vessel 10 comprises a shell 12 in two sections, upper section 16 and lower section 18, each of which is lined with a refractory material 14U in upper section 16 and 14L in lower section 18. Examples of suitable refractory materials include ceramic blanket, insulating firebrick and high alumina hot face brick, possibly with smaller amounts of chromium oxide, zirconium oxide or magnesium oxide.

As previously discussed, the lower section 18 of the vessel 10 is subject to more degrading environments and so the refractory material 14L is a much more robust refractory material. Examples of such more robust refractory materials include DIDIER DIDOFLO 89CR and RADEX COMPACFLO V253.

The vessel 10 is provided with a solid waste and/or hazardous material inlet feed port 20, and with two spaced-apart liquid waste and/or hazardous material feed inlet ports 22. The vessel 10 is also provided with a refractory-lined gas outlet conduit 24. Furthermore, the vessel 10 is provided with a slag pool collection zone 26, and, leading therefrom, a slag extraction port 28.

Further inlet ports include a plurality, in this embodiment, five, spaced-apart air inlet ports 30. These air inlet ports 30 are strategically located to ensure that the input of the air process additive blankets the entire processing zone for maximum efficiency. Also, a plurality, in this embodiment, three, steam injection ports 32 are provided. These steam injection ports 32 are strategically located to ensure that the inlet steam process additive blankets the processing zone for maximum processing efficiency, and blankets the product gas at its exit from the reactor vessel to achieve total conversion of any remaining unreacted carbon with the additional result that the endothermic reaction cools the product gas to the desired level just prior to its exit from the reactor vessel. In addition, a plurality, in this embodiment, four, CCTV inspection ports 34, are provided. These CCTV inspection ports 34 are strategically located to ensure that the operator has complete and continuous visibility of all aspects of the processing.

Two sets of plasma arc generators are provided. The first set is a fixed set of, in this embodiment, two, diametrically-opposed, side-mounted, fixed plasma arc generators 36 with center line angular displacement so as to point their plasma arc plumes to a focal point. The second set is a single top mounted plasma arc generator 38 with three degrees of freedom of movement, as shown by the arrows.

The cylindrical vessel 10 is provided with a sloping top 40. This sloping top 40 is provided to ensure that the top mounted plasma arc generator 38 can deliver its heat fully and efficiently to the required areas by means of the plasma arc generator within the reactor vessel. As shown, a zone 42 constitutes the extremely high temperature processing zone.

Two other desirable features of the reactor vessel 10 include: the act that the lower part 18 of the reactor vessel may be separated from the remainder of the reactor vessel 10. This is achieved by means of attachment flanges 44. A preheat burner port 46 is provided to enable the zone 42 inside of the reactor vessel to be preheated to a suitable initial operating temperature.

The reactor vessel 10 is supported on rails 48.

Figure 4:
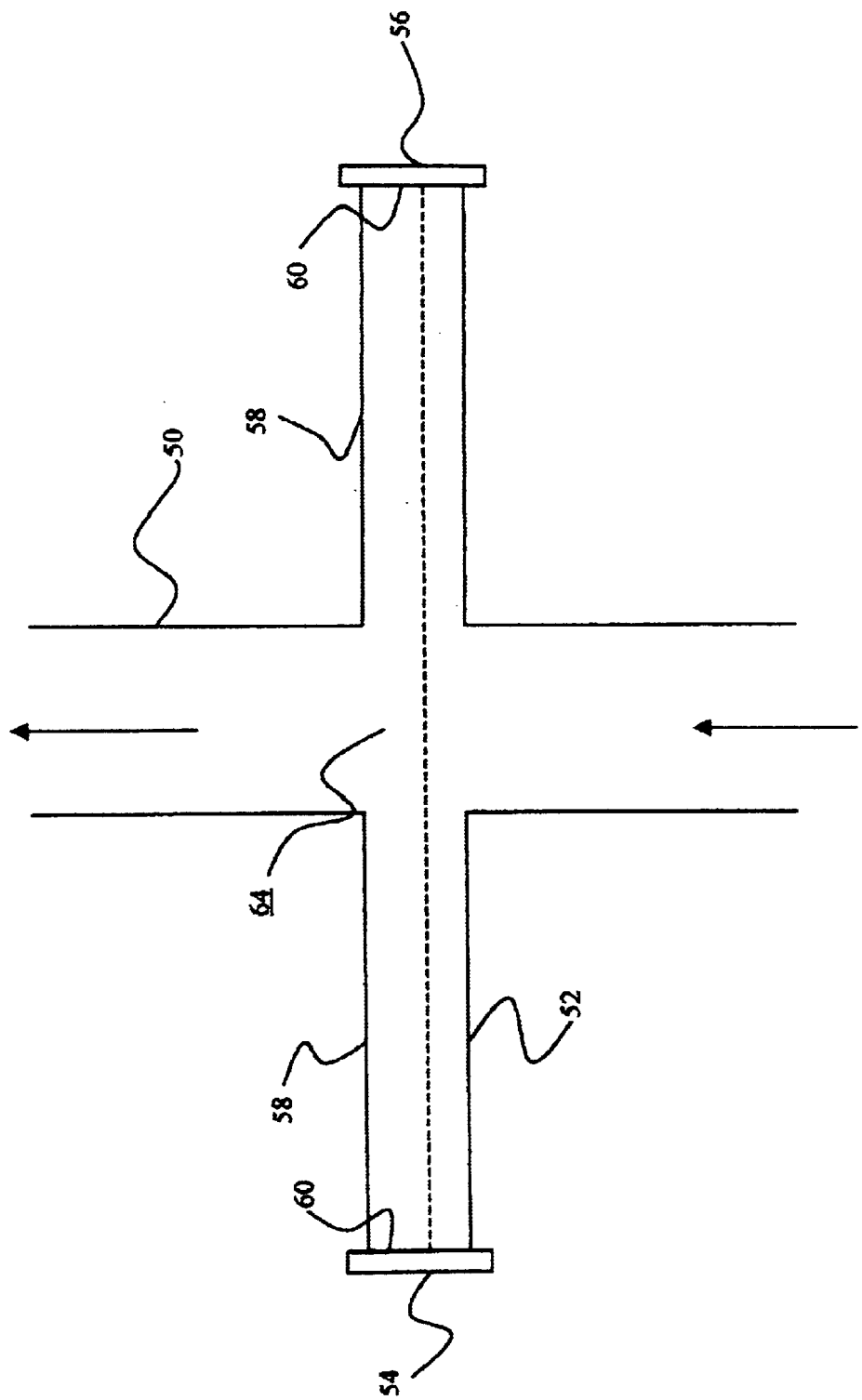
FIG. 4 is a side elevational schematic view of one embodiment of an opacity monitor forming a part of the refractory-line vessel of embodiments of aspects of the present invention.

As seen in FIG. 4, the outlet gas emerging from gas outlet conduit 24 is passed through product gas piping 50, which mounts the opacity monitor 52. The opacity monitor 52 includes a transmitter 54 and a receiver 56. Portions of the piping which houses the opacity monitor 52 are water-cooled, at 58. At the extreme ends of the opacity monitor 52, are nitrogen purge elements 60 to direct a flow of nitrogen to keep airborne particulates from depositing on the inside faces of the opacity monitor sensor elements 54 and 56.

Alternatively, or in conjunction therewith, a slightly negative pressure zone 64 may be set up in the piping 50 to keep airborne particles from depositing on the inside faces of the opacity sensor elements 54 and 56.

OPERATION OF PREFERRED EMBODIMENT

The operation of the plasma gasification reactor 10 commences with a fossil fuel burner being inserted into the preheat burner port 46 in reactor vessel 10. After a maximum temperature (e.g., 900° C.) has been achieved in vessel 10 with this burner, the burner is removed, the port 46, which permits entry of the preheat burner, is sealed and plasma arc generators 36 and 38 are inserted and turned on to bring the total reactor vessel temperature to the desired operation temperature (e.g., 1100° C. or 1200° C. depending on the waste stream being processed). At this time, a predetermined flow of process additive steam is established through steam ports 32 and a predetermined flow of process additive air is established through air ports 30. The predetermined positions of the steam ports 32 and the air ports 30 are as determined by the temperature and flow dynamic model (to be described hereinafter). Thereafter, the predetermined flow of both steam and air process additives is as determined by the chemical stimulator (to be described hereinafter) for the type of waste and/or hazardous material to be processed. Feeding of waste and/or hazardous material into vessel 10 is then commenced through solid waste port 20 and/or liquid waste ports 22 depending on the type of waste and/or hazardous material being processed. Input waste and/or hazardous material is decomposed within the extremely high temperature processing zone 42 to form a molten solid product and a product gas. The molten solid product, referred to as slag, flows to the slag pool collection area 26 where it resides until it is extracted from vessel 10 through slag extraction port 28. Slag extraction through slag extraction port 28 can be continuous when the input waste and/or hazardous material contains adequate amounts of slag producing constituents or it can be intermittent. The product gas exits vessel 10 through gas outlet conduit 24. The preferred embodiment of the refractory lined plasma gasification reactor vessel 10 contains up to three steam process additive injection ports 32, up to five air process additive injection ports 30, and up to four CCTV inspection ports 34. Other embodiments include those wherein a different number of process additive input ports is dictated by the temperature and flow dynamic model simulator (to be described hereinafter) in order to maintain the optical operational characteristics Fixed plasma arc generators 36 provide a consolidated front of an extremely high temperature processing zone 42 across the entire periphery of the refractory lined reactor vessel 10 between the input waste ports 20, 22, and the processing by-product outlet conduit 24 for the product gas and slag extraction port 28 for the molten slag. Fixed plasma arc generators 36 have a combined plasma arc plume focal point to ensure that the profile of the high temperature processing zone 42 remains complete and optimal. Plasma arc generator 38 has three degrees of freedom to permit it to add high temperature processing assistance anywhere it is required within vessel 10, ranging from heat assistance to the processing zone profile 42 created by plasma arc generators 36, to ensuring that the slag in the slag pool collection area 26 is fully processed and slag exit port 28 is kept open during all slag extraction periods.

The product gas on exit from reactor vessel 10 through outlet conduit 24 proceeds through product gas piping 50 and passes through opacity monitor 52. The opacity monitor 52 provides a measure of the amount of airborne particulates in the product gas by communication between opacity monitor transmitter 54 and opacity monitor receiver 56. Sections 58 of the piping which houses the opacity monitor 52 which contact the hot product gas piping 50 are cooled, e.g., water cooled to ensure opacity monitor transmitter 54 and opacity monitor receiver 56 are not overheated. Nitrogen purge 60 prevents deposition of any airborne particles from settling on the opacity monitor transmitter sensor 54 or on the opacity monitor receiver sensor 56, which would impede opacity monitor sensitivity and, hence accuracy. Alternatively, instead of the nitrogen purges 60, a slightly negative pressure area 64 can be maintained to prevent airborne particles from depositing on either the opacity monitor transmitter sensor 52 or the opacity monitor receiver sensor 56. The reading from opacity monitor 52 is passed to a control console for process control purposes. Process control is effected through adjustment of steam flow rate through steam process additive injection ports 32, which, in turn, simultaneously affects the air input through air process additive injection ports 30. Any changes in steam or air process additive injection into the process also affect the generated product gas flow rate.

The operator of the system maintains full and continuous visibility of all aspects of processing within vessel 10 through CCTV inspection ports 34.

Inspection and repair of the reactor vessel refractory lining 14U and 14L as required is facilitated by removing lower section 18 of refractory lined reactor vessel 10 by means of disconnection of flange 44.

In order to more effectively assist in final design to ensure optimum reactor vessel geometry, the physical characteristics and chemical composition of the input waste, and the required throughput of the system are taken into consideration.

Thus, according to aspects of the present invention, processing control is exercised through continuous reactor vessel pressure and temperature monitoring plus continuous product gas flow rate and opacity monitoring.

A detailed assessment of the required processing characteristics for most optimum destruction of the waste and/or hazardous material stream being processed includes the following, the detailed assessment of which is provided by the proprietary chemical simulator:

optima operating characteristics including processing temperature required;

product gas quantity and quality characteristics including the amount of energy which may be recoverable from it;

the chemical composition of elements which make up the product gas;

the quantity of process additives required, e.g., steam, for most complete conversion of carbon to a carbon monoxide fuel gas;

the amount of moisture in the product gas;

throughput achievable with the particular waste stream under consideration;

total system design characteristics including optimum design for lowest cost; and by-products recoverable.

Figure 5:
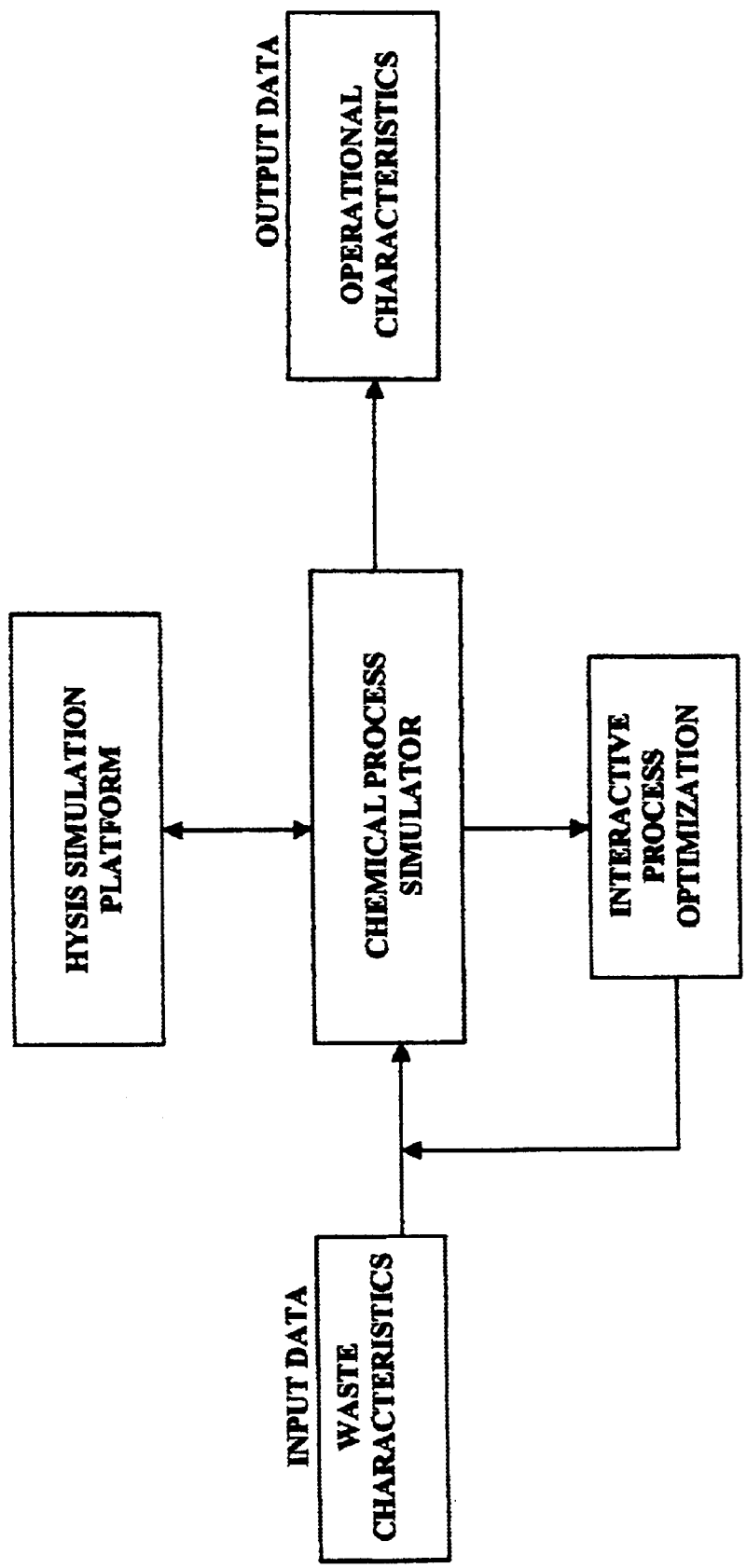
FIG. 5 is a block diagram showing the overall organization of chemical process simulation according to the present invention.
Figure 6:
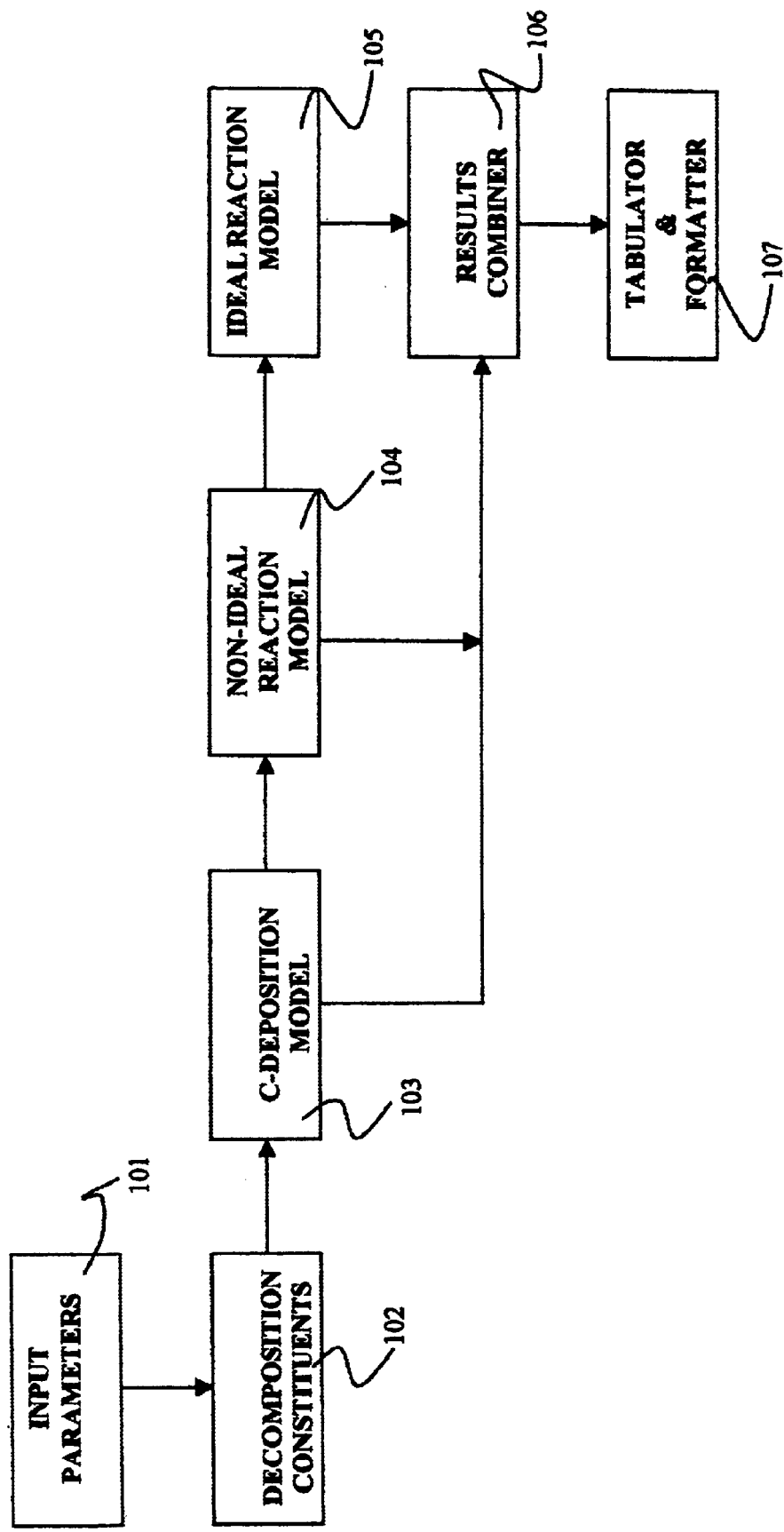
FIG. 6 is a high-level flow chart showing the chemical process simulator block in FIG. 5 in more detail.

FIG. 5 is an explicatory flow diagram of the chemical process simulator showing its functionality with variable waste characterization inputs, operator interactive inputs for optimization and system output characterizations. Input and/or process characteristics can be varied at will within the chemical process simulator to visualize processing impacts in order to arrive at the most efficient and effective disposal process for the particular waste stream under consideration. The chemical process simulator also serves as a continuous monitoring tool to determine operational characteristics changes which may be required by virtue of changes in the chemical composition of the input waste and/or hazardous material stream FIG. 6 is a high-level flow chart of the chemical process simulator of FIG. 5 showing its computational aspects. In general, the simulator consists of three main computational blocks:

(i) An Ideal Reaction Model which calculates the ideal, steady state equilibrium composition of the product gas, by minimizing the Gibbs free energy of the product chemical species in adiabatic, isobaric equilibrium.

The principle of obtaining equilibrium reaction products for simple chemical systems by Gibbs free energy minimization is well established and is often taught in introductory chemistry courses. In the late 1960's, researchers at NASA developed a general Gibbs minimization approach applicable to finding the equilibrium composition of arbitrary large systems without the need to write equilibrium reactions is explained in a publication by Gordon, S., and B. J. McBride: Computer Program for the Calculation of Complex Chemical Equilibrium Compositions with Applications; 1. Analysis. NASA Reference Publication 1311 (1994). This publication is incorporated herein by reference. The ideal reaction model operates using this approach, which a solution matrix is populated with the elemental composition of each reaction product under consideration, along with each product's Gibbs Free Energy at the current reaction temperature. The matrix is then solved for the minimum total Gibbs free energy, (while simultaneously adhering to the principle of conservation of mass by balancing the elemental inputs and outputs) by Gaussian elimination.

(ii) A Carbon Deposition Model, which calculates the amount of soot (solid Carbon C(s)) formed, or the amount of steam needed to eliminate soot formation by comparing the input composition vs. equilibrium curves.

As implemented, the ideal reaction model can only solve gas phase equilibrium. Consequently, since solid carbon has been observed to form during operation of a plasma gasification process, a separate model was developed to calculate C(s) formation rates. Curves that predict the amount of C(s) subliming from a three phase gaseous system were obtained from the book by Kyle, B. G., Chemical and Process Thermodynamics, $2^{nd}$ ed., Prentice Hall, New Jersey, 1992, which is incorporated herein by reference. These curves were converted into a numerical function that predicts the amount of solid carbon that will form at a given Temperature, molar % of Hydrogen, and molar % of oxygen in the system. Using this function, the software calculates the amount of C(s) that is formed—this amount is sent directly to the recombination section of the code, and is subtracted from the elemental composition of the reactants. This revised elemental composition is used in the subsequent non-ideal reaction model.

As a user-selectable option, this model is also used to recursively solve for the amount of water that must be added to the system in order to eliminate the formation of solid Carbon. Water is used for this application, because it contains both Hydrogen and Oxygen. Increasing either relative to the amount of Carbon in the system decreases the formation of C(s). Consequently, moisture is extremely effective in limiting the amount of C(s) formed, since it decreases the amount of Carbon in the system relative to both Oxygen and Hydrogen.

When this option is selected, the amount of C(s) formed is always zero, so it has no effect on the subsequent elemental composition. However, because additional water is added to the reaction, Hydrogen and Oxygen are added to the net elemental composition in accordance to the amount of water calculated in this step. The amount of water so calculated is also retained in memory, so that it can be outputted with the rest of the results once calculations have been completed.

(iii) A Non-ideal Reaction Model which determines the amount of methane, acetylene and ethylene that is formed in excess of the ideal as calculated by multiplying the amount of Carbon in the system by experimentally derived ratios. This approximates the result of non-total decomposition of long-chain hydrocarbons or polymers. In practice, such molecules decompose into small hydrocarbons (typically 1 or 2 Carbon hydrocarbons) before these in turn react with other chemical species. Because of the highly turbulent nature of the gaseous environment within a plasma gasification reactor, a small fraction of these hydrocarbons are carried out of the principal reaction areas before they are consumed. The specific ratios chosen for a given waste vary depending on the proximate physical composition of the material.

The products of non-ideal reactions are subtracted from the elemental composition available for ideal reactions. These products are passed to the recombination stage of the software, whereas the balance of the elemental composition is passed to the ideal reaction model. Thus, the software computes the total inputs on an elemental basis; splits the input between the three computational models; combines the results from the three computational models; tabulates the results; and stores the results in a database.

Referring to the individual blocks within FIG. 6:

Input Parameters 101: Includes the waste composition (elemental molar %, moisture content and heating value) and flow rate, the processing temperature and additives including the capability to specify air from several avenues, oxygen, water, steam and the range of iteration of any of the process inputs;

Decomposition Constituents 102: Each input to the plasma gasification reactor is converted into elemental molar flows. The total molar flow of each element is used as the primary variable for the three principle calculation routines described previously;

C-Deposition Model 103: The ideal reaction model can only solve gas-phase reactions. A separate computational block is therefore implemented (as described above) to determine the formation rate of solid Carbon C(s). The mathematical function designed to perform this calculation can alternatively be used in a recursive loop to determine the amount of water needed to prevent formation of solid Carbon;

Non-Ideal Reaction Model 104: Calculates the compounds formed by incomplete reactions. Simple hydrocarbons are formed proportionate to the amount of Carbon in the system, in tandem with user-defined ratios. These ratios are selected based on the proximate composition of the waste, and the current operating conditions. Normal kinetic models are insufficient in this application because the original waste stream can rarely be analyzed sufficiently to allow their use. Consequently, values derived experimentally with similar materials are used in this model. Elements used in these reactions are subtracted from the elemental composition available for the ideal reactions stage. The compounds formed in this stage are passed to the recombination stage, where they are agglomerated with the remainder of the results;

Ideal Reaction Model 105: Calculates the compounds formed under ideal, steady-state conditions;

Results Combiner 106: Combines the results from the C-Deposition Model 103, the Non-Ideal Reaction Model 104 and the Ideal Reaction Model 105; and Tabulator & Formatter 107: Tabulates all calculated data in a format convenient for export to most other software. In practice, data is exported to a Microsoft Excel worksheet, where the mass of each product, volume %, sensible heats, gas heating value, electricity heat input requirement and the selection of the plasma gasification process optimal operating point based on specific energy and environmental considerations are determined. The optimal operating point is the minimum processing energy required to meet environmental emission requirements.

Through the development of the chemical process simulator, the first step was the development of a process model along with the implementation of the software and the thermo-chemical database using the principle of minimization of Gibb's free energy to allow prediction of the product gas components at a specific temperature and specific set of input parameters. A C—H—O system was implemented to determine the areas of carbon deposition. A calculation method for the energy balance was developed for the plasma gasification process to determine the power requirement of the plasma arc generator for gasification of municipal solid waste. It was then extrapolated to include other carbonaceous materials.

For pure substances, elemental composition, and thermodynamic properties are readily available. However, most waste materials are inhomogeneous, complex in structure and often have unknown chemical formulae. In these cases the molar composition of the waste is determined from its mass composition which is readily obtained by laboratory analysis. Similarly, the standard heat of formation of the waste material must also be known. Typically, this is determined in the laboratory by bomb calorimetry, although for more homogeneous material, it is often possible to find these values from literature.

The plasma arc generator power requirement is calculated based on plasma reactor vessel inputs and outputs, and plasma gasification conditions. Energy in to the plasma reactor vessel is the sum of the energy supplied by the plasma arc generator and the total enthalpy of the input waste into the plasma reactor vessel. Energy out is the sum of the total enthalpy of output elements from the plasma reactor vessel and the heat loss through the plasma reactor vessel walls. The total power required from the plasma arc generator is the difference of the two, accounting for efficiency of the plasma arc generator itself.

The chemical process simulator provides performance data on the plasma gasification of wastes since its development integrated the existing extensive practical database results. The complete simulator is in two discrete modules, the mass/elemental balance of the system is derived using the previously described software, whereas results tabulated, and the energy balance of the system is derived using an Excel(™) worksheet. The results worksheet is maintained as a separate module for three main reasons:

(a) Facilitating reduced development time;
(b) Facilitating the ability to rapidly make changes to the thermodynamic model without the need for substantial alteration of the software; and
(c) Facilitating data portability into documents/spreadsheets/presentations as supported by Excel, eliminating the need for coding these capabilities into the simulator itself.

This Excel worksheet calculates thermodynamic properties of the relevant compounds using Shomate equations. Constants for these equations were obtained from the NASA thermodynamic database associated with the ideal reaction method described previously, as provided in the publication by Bonnie J. McBride and Sanford Gordon, Computer Program for Calculation of Complex Chemical Equilibrium Compositions and Applications: II. Users Manual and Program Description, NASA Reference Publication 1311, June 1996; which is incorporated herein by reference. These thermodynamic properties are used, together with standard thermodynamic calculations to determine the overall energy balance of the gasification reaction, and by inference, the net supplemental heat required to drive the process.

Recognizing that the reactor vessel is not at a uniform temperature, the simulator calculates gas composition and flow rates across a range of several different temperatures. A gas composition is then interpolated on the spreadsheet for the desired vessel temperature, by giving each of the different simulated temperature scenarios a weight according to a Poisson probability with a mean value equal to the average reactor vessel temperature. The sum of the weight-reduced scenarios is then normalized, providing the "average" result. It is this "average" result that is, in turn, used to calculate the energy balance of the system A further refinement is that the CHO boundary system is now mathematically modelled within the simulator. Thus, the simulator can now automatically calculate the amount of C(s) generated for a given scenario. Because C(s) formation is detrimental to the cleanliness of the product gas, a routine was developed to automatically adjust the steam injection rate to the minimum level required to completely eliminate the formation of this carbon. It has been found that this approach gives gas compositions closer to experimental data than a strict one-temperature model. The following table shows a comparison of the results for municipal solid waste:

Comparison of Simulated and Experimental Results for MSW

| Product Gas Composition | Modified Simulator | | Gibbs Minimization Model | | Actual Test Data |
|---|---|---|---|---|---|
| | Vessel Exit | Scrubber Exit | Vessel Exit | Scrubber Exit | Scrubber Exit |
| C | 1.580 kg | — | — | — | — |
| $CH_4$ | 2.12% | 2.35% | 30 ppm | 34 ppm | 2.76% |
| $C_2H_2$ | 0.11% | 0.12% | — | — | 0.14% |
| $C_2H_4$ | 0.17% | 0.18% | — | — | 0.22% |
| CO | 22.46% | 24.91% | 25.04% | 28.95% | 29.19% |
| $CO_2$ | 6.41% | 7.11% | 6.23% | 7.21% | 8.33% |
| COS | 21 ppm | — | 21 ppm | — | — |
| $H_2$ | 36.43% | 40.40% | 36.76% | 42.49% | 37.74% |
| HCl | 947 ppm | — | 934 ppm | — | — |
| $H_2O$ | 9.64% | — | 13.30% | — | — |
| HS | 3 ppm | — | — | — | — |
| $H_2S$ | 971 ppm | — | 959 ppm | — | — |
| $N_2$ | 19.08% | 21.16% | 18.47% | 21.35% | 21.22% |
| $NH_3$ | 29 ppm | — | 18 ppm | — | — |
| $O_2$ | 3.39% | 3.76% | — | — | 0.40% |

In order to develop a more reliable and detailed estimate of operating costs, the chemical process simulator also calculates power consumption for the parasitic loads associated with a plasma gasification system, as well as the electrical power generated by a steam turbine, combined cycle gas turbine and a gas engine facility. Performance data for individual equipment is, by default, scaled from a baseline facility design. However, since the calculations are performed on a spreadsheet, equipment performance can quickly be adjusted to reflect different configurations As a result of the enhanced capability of the chemical process simulator to generate data for ranges of input conditions and flows, it is possible to quickly generate an optimised scenario by varying steam & air flows across a user-selected range, then choosing the scenario with the preferred gas composition and power characteristics. This code was designed with versatility in mind. It gives exactly what is required by RCL designers (and strictly no more than that so the speed is not jeopardised). PLUS, it allows very fast iterations for selection of RCL's definition of "optimal" operating point. This is where our code and established platforms such as ASPEN and HYSYS differ.

Because of the efficiencies associated with the use and generation of electricity, for combustible wastes it will inevitably be more energy efficient to increase the amount of air allowed into the reactor vessel. Addition of sufficient amounts of air will usually reduce the supplemental plasma heat required to maintain the reaction at steady state to or below zero. Reduction of the plasma heat below zero (which for these purposes means that the reactor temperature is increasing) is usually accomplished by increasing the air flow to near stoichiometric rates for combustion. The inherent cleanliness and enhanced process control associated with pyrolysis-gasification reactions generally dictate the selection of operating parameters that do not permit such an excess of air, but require the addition of supplemental heat.

Thus, for the purposes of designing a baseline gasification system for a given waste, a methodology was developed for the selection of a minimum power requirement for a given waste input. Optimization of the process is carried out with regards to air emissions, energy efficiency, capital costs, and operating costs. Since the largest variable in capital costs is the size of the plasma torch and power supply, and operating costs are also linked directly to torch power, energy efficiency and air emissions become the main optimization criteria. Pollutant formation is affected by operating temperature, and input composition. Since the waste stream is not variable, the input composition is changed only by variations in air and steam inputs. Power consumption is similarly affected by these parameters.

Consequently, in order to optimize a scenario, the operating temperature is selected with regards to minimization of pollutants, and air and steam flows are varied to reduce the operating power to the minimum power scenario. It was found that while the addition of steam will reduce the operating power, the effect is not as significant as the addition of a comparable mass of air. Steam addition, however, results in an improved product gas heating value.

The chemical process simulator models the effects of non-ideal reactions due to incomplete reactions and reaction kinetics. These account for the observed deviations in experimental product gas chemistry. It also includes a model for the formation of soot (carbon black), which is a precursor to dioxin formation. In addition to minimizing dioxin formation, avoiding the carbon-forming regime also significantly reduces the formation of tars and other polyaromatic hydrocarbons, which is normally a serious complication of typical gasification processes.

The chemical process simulator allows for rapid generation and exploration of different operating scenarios. Consequently, the most economic operating scenario in which there are no technical hurdles encountered can be quickly determined. The chemical process simulator is also used to develop process control logic for extremely non-homogeneous waste (e.g. multi-waste streams). Because a number of "what if" scenarios have been developed ahead of time using process simulation, the control system can extrapolate the current waste composition from the tail-gas composition, and adjust the process chemistry to an "ideal" operating point. Again, the versatility of the RCL code and the relative ease and speed of data acquisition and manipulation makes this possible.

The temperature and flow dynamic model simulator provides isometric printouts of temperature distribution and gas flow characteristics throughout any cross section of the reactor vessel. These features provide an essential tool for optimization of the reactor vessel design to ensure there are no gas paths within the reactor vessel which would permit gaseous elements to exit the vessel without being subjected to the full required processing temperature and residence time as well as to confirm that refractory erosion, hot spots and cold spots are avoided. The printout from this simulator dictates the optimum physical positioning of input additive ports and monitors the overall impact of the input process additives flow as identified by the chemical simulator. The influence of physical position changes of these ports coupled with the processing additive flow rates can be assessed very readily and the most optimum positions can be determined.

Figure 7:
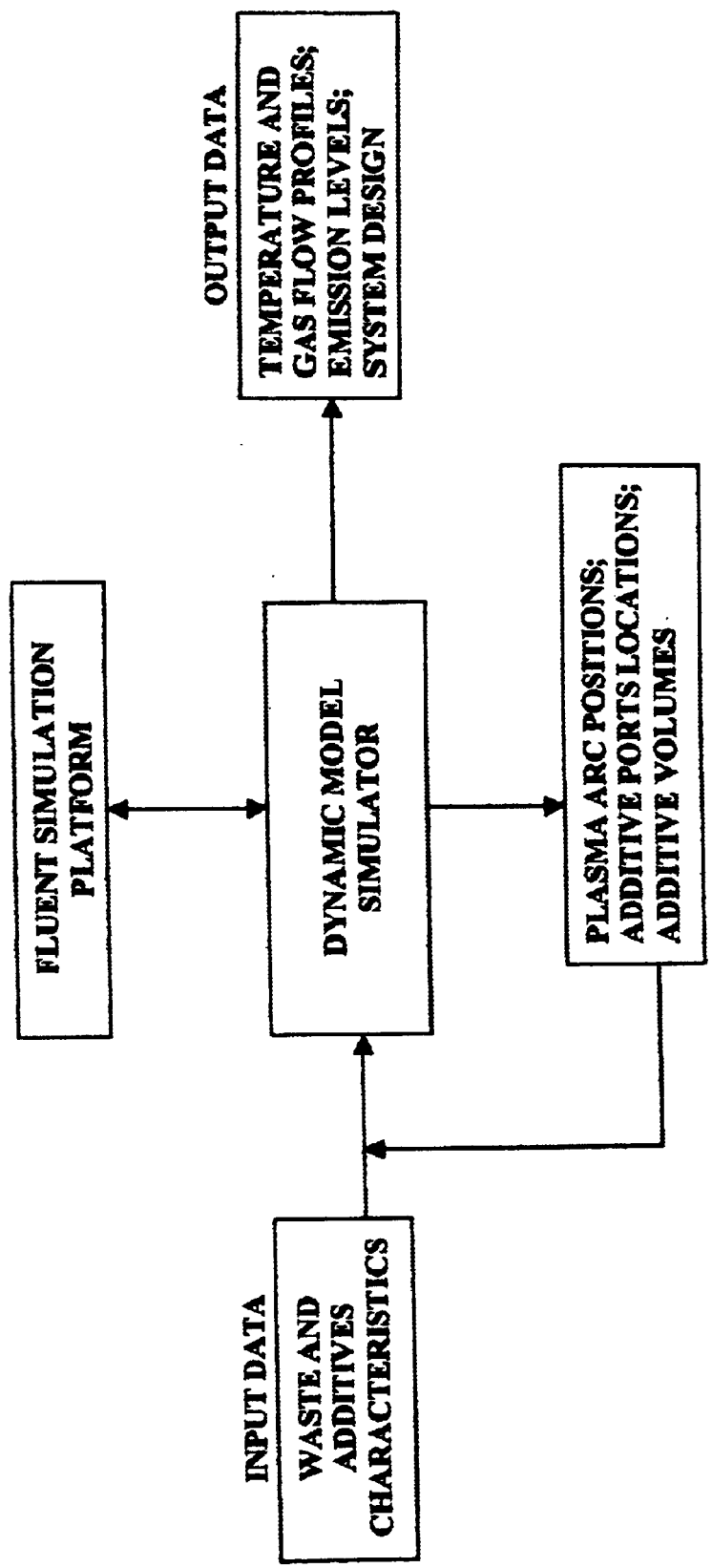
FIG. 7 is a block flow diagram showing the overall organization of the temperature and dynamic model simulation according to the present invention.

FIG. 7 is an explicatory flow diagram of the temperature and flow dynamic model simulator showing its functionality with variable waste characterization inputs, operator interactive inputs for optimization and system output design characterizations.

Figure 8:
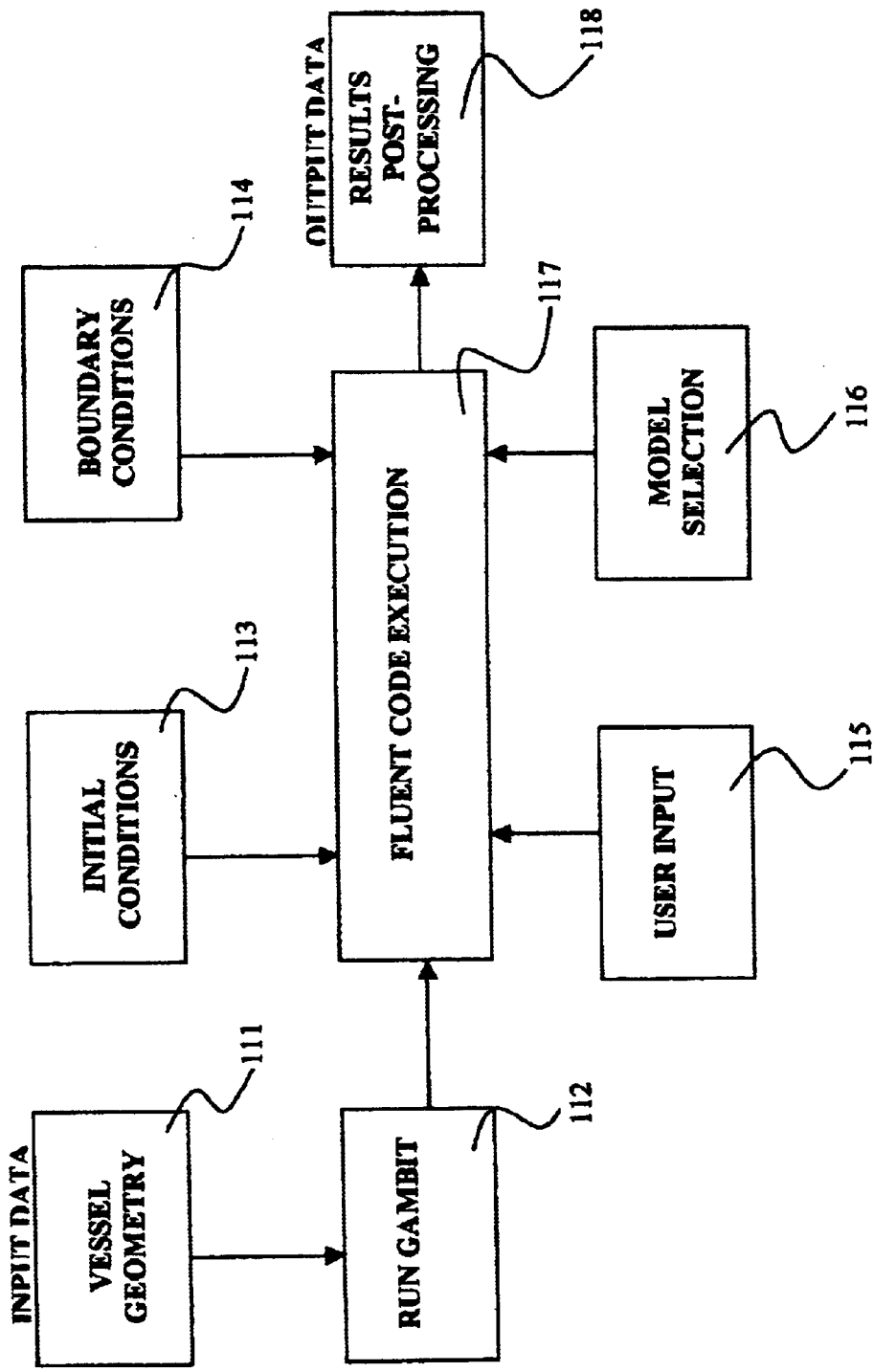
FIG. 8 is a high-level flow chart showing the dynamic model simulator block in FIG. 7 in more detail.

FIG. 8 is a high level flow chart of the temperature and flow dynamic model simulator showing its computational aspects. With reference to FIG. 8, the function of each block in the flow chart is as follows:

Vessel Geometry 111: Input of the geometrical dimensions of the plasma gasification reactor vessel to create the computational domain on which the numerical results of the mathematical model are calculated;

Run Gambit 112; Before running Fluent, it is necessary to run Gambit to set up the solution domain and to generate the computational meshes. Meshes can be selected on virtually any plane through the periphery of the reactor vessel and the fineness of the mesh can be selected depending on the geometrical dimensions and the operational needs of the results printout;

Initial Condition 113: The assumed initial condition includes all the quantities, such as velocity, temperature, etc., to be calculated. The initial values of these quantities are required in order to initiate the iteration process;

Boundary Conditions 114: Input data defining conditions of operation, including the flow rate, composition and temperature from the plasma arc generators, the air jets, the steam jets, are required by the CFD code (Fluent) to define the adequate boundary conditions which simulate the operation condition of the plasma gasification reactor vessel as close as possible;

Input 115 (the number of species and reactions to be included in the simulation): This is to control the level of sophistication to model the chemical reactions. The inclusion of major species is important to get the temperature and density correct. Inclusion of minor species is essential to predict pollutant emissions;

Model Selection 116 (user selection of models to simulate turbulence and turbulent combustion): Fluent offers various mathematical models to simulate turbulence and turbulent combustion.

Fluent Code Execution 117: Once the computational meshes are generated and the boundary and initial conditions are defined the Fluent code is executed until a predefined convergence criterion is satisfied. The code is essentially a non-linear solver of system of equations describing the convergence of mass, momentum, energy, and species; and Results Post-Processing 118: Generates graphic plots to display the numerical results for analysis and visualization. Generated data is stored as normal data files.

The computational fluid dynamic (CFD) approach, which is the basis of Fluent, is a very useful tool in the evaluation and improvement of new plasma gasification reactor vessel designs. CFD permits innovative computer modelling and numerical analysis techniques in the areas of flow, heat transfer, and combusting flows. These techniques are a powerful tool to improve the design and operation of various industrial systems. Turbulent mixing and heat transfer in the plasma gasification reactor vessel are numerically simulated in order to evaluate operational performance of the reactor vessel. Inlet conditions including velocity and enthalpy of the plasma arc generators, air and steam jets are specified as inputs. Adiabatic heat transfer conditions are assumed at the reactor vessel walls. Continuous feed of solid waste is simulated by a low-temperature and low-velocity gas stream flowing into the reactor vessel. The solid waste removal region is simulated with a fixed temperature zone at the desired level. Zero-gradient is assumed for all variables at the reactor vessel exit.

The energy conservation equation is solved simultaneously with the momentum and turbulence equations. Every effort is made to simulate both the velocity and the temperature profiles as close to reality as possible. The results obtained provide qualitative to semi-quantitative information on both flow and temperature fields in the reactor vessel. These velocity and temperature distributions provide direction to improve the design and operation of the plasma gasification reactor.

Flow modeling of the reactor vessel is performed to ensure proper mixing of process inputs, and to ensure that kinetic effects are not significant. In the normal design process, results from flow modeling are used recursively to fine-time the kinetic effects in the chemical simulation, as well as to adjust the reaction temperature profile within the simulator. Flow modeling results are also used to assist refractory design since all operating characteristics at the refractory surface can readily be identified.

Velocity and temperature mesh profile printouts are scrutinized for acceptability of operations for the specified waste stream. Any less than optimal aspects can be addressed through a number of operational and/or dimensional design changes such as:

(a) The physical shape and/or size of the reactor vessel;

(b) The physical location(s), orientation and/or power level(s) of the plasma arc generator(s);

(c) The physical location(s) and/or orientation of the various process additive ports;

(d) The dimensions of the process additive ports to effect changes in process additive inlet velocity; or (e) The input level(s) of the various process additive agents.

The simulator can then be rerun and the new results assessed for operational improvements. Such iterations can be repeated any number of times until an optimal scenario of operations is found for the waste stream being considered. The benefit of such a procedure is self evident since the optimal operating scenario can be identified very rapidly and then the operating system can be commenced with the maximum probability of success.

Input and/or process characteristics can be varied at will within the chemical simulator to visualize processing impacts in order to arrive at the most efficient and effective disposal process for the particular waste system under consideration. The chemical simulator also serves as a continuous monitoring tool to determine operational characteristics changes which may be required by virtue of changes in the chemical composition of the input waste and/or hazardous material stream.

The temperature and flow dynamic model simulator provides isometric printouts of temperature distribution and gas flow characteristics throughout any cross section of the reactor vessel. These features provide an essential tool for optimization of the reactor vessel design to ensure there are no gas paths within the reactor vessel which would permit gaseous elements to exit the vessel without being subjected to the fill required processing temperature and residence time as well as to confirm that refractory erosion, hot spots and cold spots are avoided. The printout from this simulator dictates the optimum physical positioning of input additive ports and monitors the overall impact of the input process additives flow as identified by the chemical simulator. The influence of physical position changes of these ports coupled with the processing additive flow rates can be assessed very readily and the most optimum positions can be determined.

While the invention has been so shown, described and illustrated, it should be understood by those skilled in the art that equivalent changes in form and detail may be made therein. One such change in form is that for ease of fabrication, the described cylindrical reactor vessel can be multi-sided with low profile sides and corresponding multi-sloping top sections converging to the gas exit port and with the plasma arc generators being inserted into the vessel through the top sloping sections. In a further embodiment of this multi-sided reactor vessel, the corresponding multi-sloping top section may converge to the gas exit in the center profile of the reactor vessel.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and "intended" to be, within the full range of equivalence of the following claims.

What is claimed is:

1. An apparatus for the disposal of waste and/or hazardous materials, comprising:

a refractory-lined reactor vessel;

plasma-generating means within said refractory-lined reactor vessel for producing a high temperature plasma processing zone which has a substantially-uniform high temperature across the entire periphery of said refractory-lined reactor vessel, said plasma-generating means comprising at least one fixed-position plasma arc generator, and at least one movable plasma arc generator;

first feeding means for feeding said waste and/or hazardous materials to, and through, said high temperature plasma processing zone;

second feeding means for feeding sufficient process additive agents to said high temperature plasma processing zone to cause the substantially-complete decomposition of said waste and/or hazardous materials and conversion into stable non-hazardous materials;

controlling means for controlling said plasma generating means and the flow of said waste and/or hazardous materials through said high temperature plasma processing zone to ensure that all said waste and/or hazardous material reaches a sufficiently high temperature, for a sufficient period of time thermally to decompose said waste and/or hazardous materials and convert them into said stable non-hazardous final products;

gas removal means for removing product gas from said refractory lined reactor vessel with a gas exit velocity conducive to gasborne solids to fall back into the reactor vessel as opposed to being carried out of the reactor vessel with the exiting gas;

monitoring means for monitoring said product gas to determine the amount of particulate matter in said product gas and regulate said gas exit velocity; and slag removing means for removing stable non-hazardous slag from said apparatus.

2. The apparatus as claimed in claim 1, wherein said at least one fixed position plasma arc generator comprises a pair of fixed-position plasma arc generators which are disposed within said refractory-lined reactor vessel from opposite sides thereof with angular displacement relative to each other so as to cause their plasma arc plumes to intersect at a focal point which is near the center of said waste and/or hazardous material input.

3. The apparatus as claimed in claim 1, wherein said at least one movable plasma arc generator comprises a single movable plasma arc generator which is mounted at the top of said refractory-lined reactor vessel and possesses three degrees of freedom to permit aiming towards said focal point created by the intersection of plasma arc plumes from the fixed-position plasma arc generators and towards the slag pool at or near a slag exit port.

4. The apparatus as claimed in claim 1, wherein said at least one fixed-position plasma arc generator comprises a pair of fixed-position plasma arc generators which are disposed within said refractory-lined reactor vessel from opposite sides thereof with angular displacement relative to each other so as to cause their plasma arc plumes to intersect at a focal point which is near the center of the waste and/or hazardous material input, and further wherein said at least one movable plasma arc generator comprises a single movable plasma arc generator which is mounted at the top of said refractory-lined reactor vessel and possesses three degrees of freedom to permit aiming towards said focal point created by the intersection of plasma arc plumes from the fixed-position plasma arc generators and towards the slag pool at or near a slag exit port.

5. The apparatus as claimed in claim 1, wherein said first feeding means comprises a plurality of waste and/or hazardous material feed ports, each of which is configured to feed directly towards said focal point.

6. The apparatus as claimed in claim 1, wherein said gas removal means and said solids removal means are outlet ports which are diametrically opposite to said first feeding means.

7. The apparatus as claimed in claim 1, wherein said at least one movable plasma arc generator comprises a single movable plasma arc generator which is mounted at the top of said refractory-lined reactor vessel and possesses three degrees of freedom to permit aiming towards said focal point and towards slag pool, wherein said gas removal means and said solids removal means are outlet ports which are diametrically opposite to said first feeding means, and further wherein said movable plasma arc generator is disposed in close proximity to said ports.

8. The apparatus as claimed in claim 1, including at least one port for the injection of steam towards said focal point.

9. The apparatus as claimed in claim 1, wherein said feeding means comprises a plurality of air process additive inlet ports disposed in spaced-apart relation around said refractory-lined reactor vessel.

10. The apparatus as claimed in claim 1, wherein said gas removal means comprises a gas exit port which is configured for an exit velocity of said gas conducive for gasborne solids to fall back into the reactor vessel rather than be carried out of the reactor vessel by the exiting gas stream.

11. The apparatus as claimed in claim 1, wherein a lower section of said refractory-lined reactor vessel is flanged to facilitate removal of said lower section.

12. The apparatus as claimed in claim 1, wherein said refractory lining comprises materials similar to ceramic blanket, insulating firebrick, and high alumina hot face brick, optionally containing small amounts of chromium oxide, zirconium oxide or magnesium oxide.

13. The apparatus as claimed in claim 1, wherein a lower section of said refractory-lined reactor vessel consists of a hot face refractory, said hot face refractory comprising materials similar to DIDIER DIDOFLO 89CR(™), and RADEX COMPAC-FLO V253(™).

14. The apparatus as claimed in claim 1, including water cooling means for a lower section of said refractory-lined reactor vessel.

15. The apparatus as claimed in claim 1, wherein said monitoring means includes sensors which are configured to determine the opacity of said exit gas stream.

16. The apparatus as claimed in claim 1, wherein said sensors are maintained essentially-deposit free by nitrogen purge element configured to provide a flow of nitrogen across the face of said sensors.

17. The apparatus as claimed in claim 1, wherein said sensors are maintained essentially-deposit free by elements for maintaining a negative pressure in the region of said sensors.

18. The apparatus as claimed in claim 1, also including a removable preheat burner within said refractory-lined reactor vessel.

19. The apparatus as claimed in claim 1, wherein said refractory-lined reactor vessel is cylindrical.

20. A method for the disposal of waste and/or hazardous materials, comprising:
providing a refractory-lined cylindrical reactor vessel with plasma-generating means within said refractory-lined reactor vessel and producing a high temperature plasma processing zone therein which has a substantially-uniform high temperature processing zone across the entire periphery of said refractory-lined reactor vessel, by using plasma-generating means comprising at least one fixed-position plasma arc generator, and at least one movable plasma arc generator;
feeding solid and/or liquid said waste and/or hazardous materials to, and through, said high temperature plasma processing zone;
selectively feeding sufficient process additive agents to said high temperature plasma processing zone, for completely decomposing said waste and/or hazardous materials and converting them into stable, non-hazardous gases and slag materials;
removing gaseous products from said high temperature plasma zone;
monitoring said gaseous products to determine the amount of particulate material in said gaseous products;
removing stable non-hazardous final slag product from said refractory-lined reactor vessel; and
injecting steam as process additive agent at a product gas exit.

21. The method as claimed in claim 20, which comprises disposing said movable plasma arc generators in close proximity to ports for continuously feeding said waste and/or hazardous materials to, and through, said high temperature plasma processing zone.

22. The method as claimed in claim 20, which further includes injecting steam process additive towards said high temperature plasma processing zone.

23. The method as claimed in claim 20, which comprises disposing process additive ports in spaced-apart relation around said refractory lined cylindrical reactor vessel and selectively feeding said process additive agents into said high temperature plasma processing zone through said process additive ports.

24. The method as claimed in claim 20, which comprises regulating gas exit velocity to be conducive for airborne solids to fall back into the reactor vessel as opposed to being carried out of the reactor vessel with exiting gas.

25. The method of claim 20, which includes cooling a lower section of said refractory-lined cylindrical reactor vessel.

26. The method as claimed in claim 20, wherein said monitoring comprises determining the opacity of said gaseous products by opacity sensors.

27. The method as claimed in claim 20, which comprises maintaining said opacity sensors essentially deposit free by flowing a stream of nitrogen across the face of said sensors.

28. The method as claimed in claim 20, which comprises maintaining said opacity sensors essentially deposit free by maintaining a negative pressure on the region of said sensors.

29. The method as claimed in claim 20, which comprises including the first step of preheating the refractory-lined cylindrical reactor vessel by means of a removable burner.

* * * * *